J. V. ROBINSON.

AUTOMATIC TRAIN PIPE CONNECTOR.

APPLICATION FILED MAR. 5, 1921.

Reissued July 4, 1922.

15,400.

4 SHEETS—SHEET 1.

Inventor

Joseph V. Robinson

By Watson, Cole, Grindle & Watson

Att'ys

J. V. ROBINSON.

AUTOMATIC TRAIN PIPE CONNECTOR.

APPLICATION FILED MAR. 5, 1921.

Reissued July 4, 1922. 15,400.

4 SHEETS—SHEET 2.

Inventor

Joseph V. Robinson

By Watson, Cole, Marse and Grindle

Att'ys

J. V. ROBINSON.

AUTOMATIC TRAIN PIPE CONNECTOR.

APPLICATION FILED MAR. 5, 1921.

Reissued July 4, 1922.

15,400.

4 SHEETS—SHEET 3.

Inventor

Joseph V. Robinson

By Watson, Coit, Morse & Grindle

Att'ys

J. V. ROBINSON.

AUTOMATIC TRAIN PIPE CONNECTOR.

APPLICATION FILED MAR. 5, 1921.

Reissued July 4, 1922. 15,400.

4 SHEETS—SHEET 4.

Inventor

Joseph V. Robinson

By Watson, Coit, Morse and Grindle

Att'ys

UNITED STATES PATENT OFFICE.

JOSEPH V. ROBINSON, OF MORRISTOWN, NEW JERSEY.

AUTOMATIC TRAIN-PIPE CONNECTOR.

15,400. Specification of Reissued Letters Patent. Reissued July 4, 1922.

Original No. 1,245,784, dated November 6, 1917, Serial No. 781,194, filed July 25, 1913. Reissue No. 14,873, dated June 1, 1920, Serial No. 334,880, filed October 31, 1919. This application for reissue filed March 5, 1921. Serial No. 450,063.

*To all whom it may concern:*

Be it known that I, JOSEPH V. ROBINSON, a citizen of the United States, residing at Morristown, Morris County, in the State of New Jersey, have invented certain new and useful Improvements in Automatic Train-Pipe Connectors, of which the following is a specification.

My invention relates to improvements in automatic train pipe connectors and aims to improve certain features of the train pipe connectors described in my earlier applications.

One of the objects of the invention is to support the connector head and the body on its base, or supporting bracket, so that there will be the minimum of resistance to free universal movement of the head when connected to a mating head, thus insuring a perfect connection between the heads and preventing them from opening up or rocking one upon the other under the sharp whipping motion of service as when the cars round a curve or run over uneven track.

Another object of my invention is to support the connector head with the minimum resistance to universal movement as aforesaid, and project it longitudinally of the car by a force the resistance of which to such longitudinal movement will increase in greater progress than the extent of such movement of the head, thus effectually avoiding undue shocks and strains upon the head.

Still other objects and novel features of my invention will be apparent from the following description taken in connection with the drawings, in which.

Figure 1:
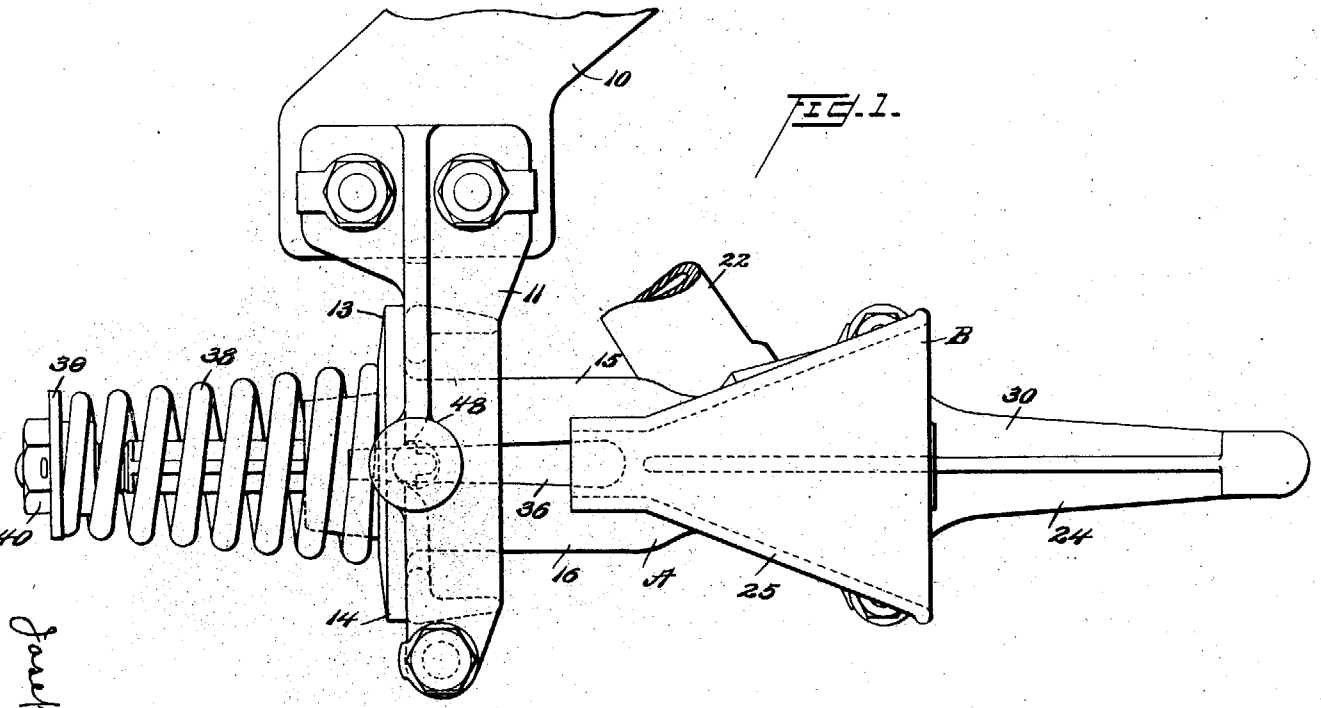
Figure 1 is a side elevation of the connector.
Figure 2:
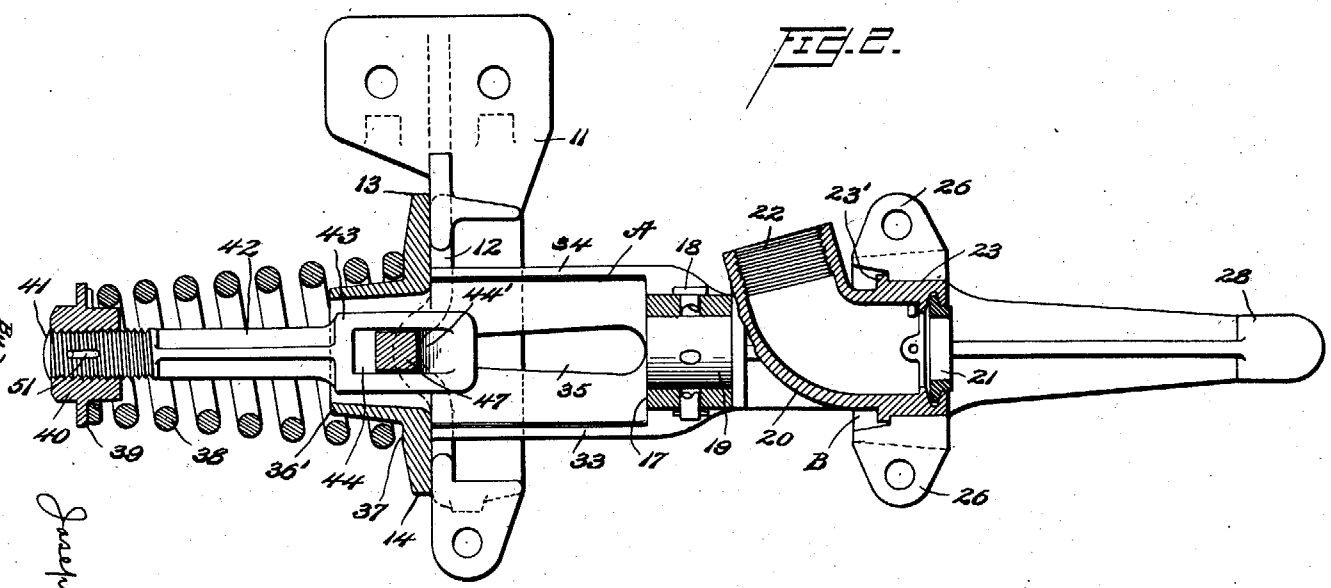
Figure 2 is a vertical longitudinal section of the same with the pipe connection turned partially to show in section.

Referring to the drawings, 10 designates a hanger or part which is permanently connected to the car coupler of the car. A bracket or base 11 is bolted to the part 10 and comprises two similar halves which when bolted to the hanger 10 form a loose fitting collar surrounding the body of the connector, 12 designating the opening in the base 11 through which the body of the connector extends. The rear face of the base 11 is flat and forms a bearing or abutment for flanges or projections 13, 14, cast integral with the connector body. The body comprises a hollow member or casting A slotted at 33, 34, 35 and 36 and cast integral with the oppositely disposed projections 13 and 14, which constitute a partial flange at the rear of the body or member A. It will be noted that the upper flange 13 is longer than the lower one. This is in order to render the resistance of the supports in the vertical plane uniform when one car is higher than the adjacent one. In a coupling under vertical disalignment, the higher connector is required to lift the lower one and the weight of the head of the higher connector tends to force it downward, whereas the weight of the head on the lower connector tends to hold it down. This causes the higher connector to drop more than the lower one rises when coupling under these conditions, and consequently the heads tend to jam or cramp. To overcome this objection, the upper flange 13 is made of greater length than the lower one, so that the higher connector is stiffened against movement downwardly in the vertical plane sufficiently to equal the resistance of the lower connector in moving upwardly in the vertical plane. At its forward end the body A is provided with a hub 17 which has holes drilled in diametrically opposite sides thereof to receive a pin 18. The pin 18 passing through the holes in the hub 17 is for the purpose of attaching the shank 19 to the body, the shank being constructed so as to fit into the hub 17 and being provided with holes to receive the pin 18. This arrangement produces a construction in which the connector head B and the shank 19 with its nipple 20 may be readily removed from the hub 17. The head of the connector comprises a fitting or nipple 20 to which the shank 19 is integrally connected, and the forward end of the fitting 20 having a port opening 21 therein which is provided with a suitable gasket which projects slightly beyond the face of the connector head. The fitting 20 leads out to the side of the connector head and is provided with threads 22 to attach other fittings, pipes, or hose connections to lead air or steam from the train line to the fitting.

To bring the corresponding ports of two mating connector heads into register, gathering means are mounted at the forward end 23 of the fitting 20. In the present instance, I have disclosed the pin and funnel type of gathering device, but it is to be understood that the fitting 20 may also be equipped with other forms of gathering devices. A pin 24 and a funnel 25 are supported on the extension 23 and on opposite sides of the port 21 and these constitute the head B of the connector. The pin and funnel device comprises two separate castings, the pin 24 being formed with two ears 26 at its inner end while the funnel is also a separate casting and formed with two ears 27 at opposite sides of its inner end, the two castings having cooperating recesses on their abutting faces and between the ears so that when the castings are secured together at the ears, the recesses form a circular opening to receive and clamp the end 23 of the fitting 20, which end 23 extends through said opening and flush with the face of the connector head. There is also a groove formed at the interior of the circular opening to receive the bead 23′ on the fitting 20, whereby the gathering pin and funnel members are secured to the forward end of the connector in a convenient manner and a gathering device is provided which may be readily removed and parts replaced if one or the other of the members comprising the same breaks or is worn out. The pins 23″, of unequal diameters, fit into corresponding holes in the gathering pin and funnel member and prevent incorrect assembly of these latter parts on the end 23 of the fitting 20.

Figure 3:
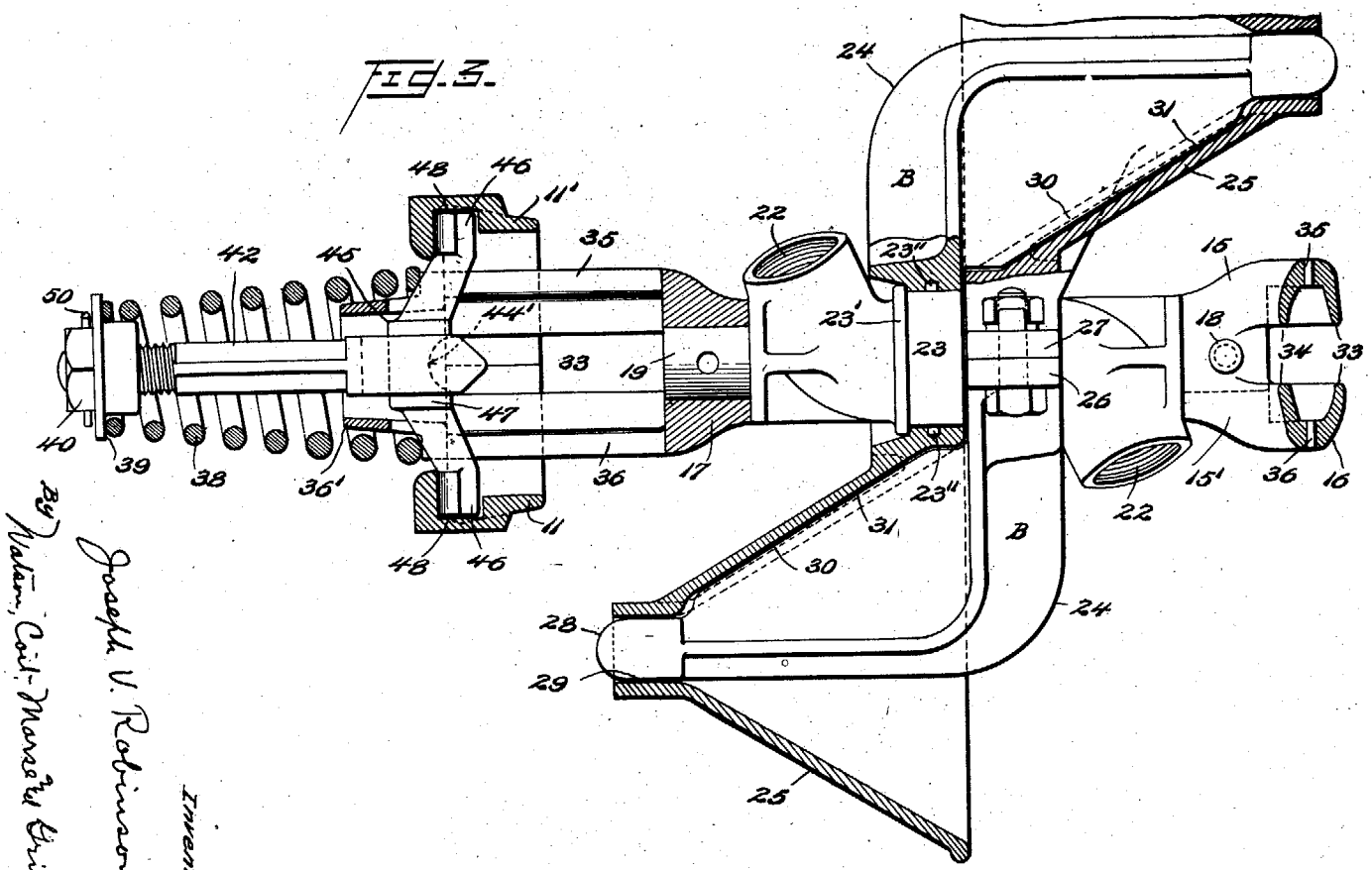
Figure 3 is a horizontal longitudinal section of the same, the parts on a mating connector being shown in plan.
Figure 4:
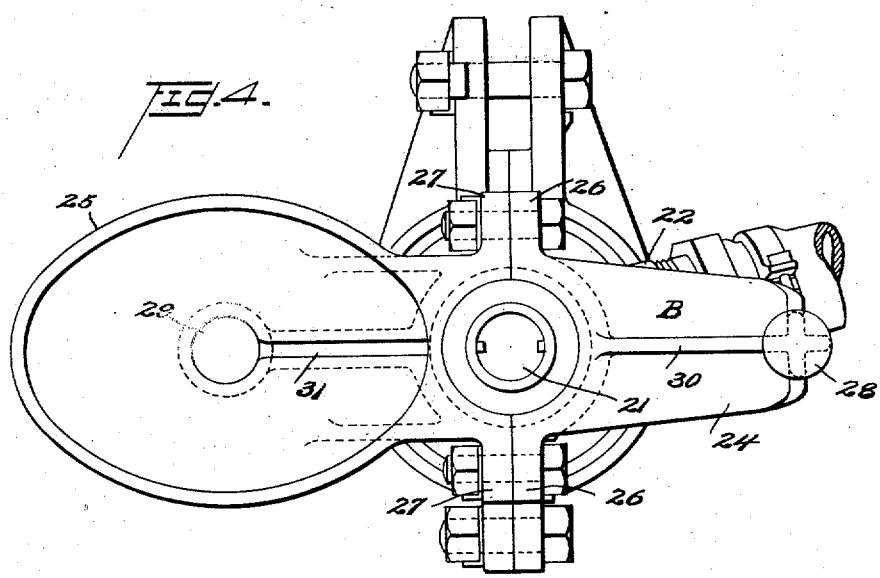
Figure 4 is a front elevation of the connector.
Figure 5:
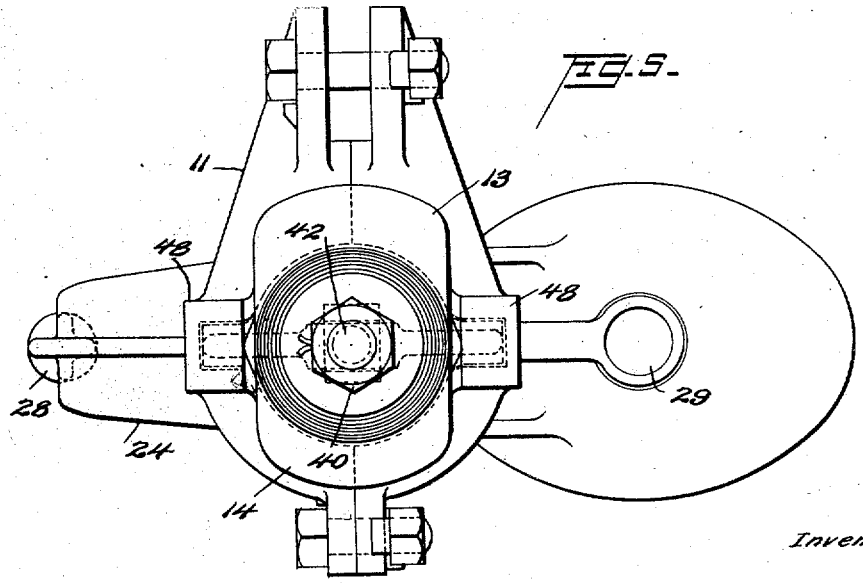
Figure 5 is a rear elevation of the same.

The pin 24 comprises a curved arm substantially L-shaped as shown in Figure 3 and is provided with a head 28 at its outer end to fit a recess 29 at the apex of the funnel 25. On the side of the pin 24 nearest the connector body and extending from the head 28 and to the base of the pin, there is a reinforcing web 30 which is adapted to register with and fit a corresponding groove 31 extending longitudinally of the inclined wall of the funnel 25 and located between the recess 29 and the port opening 21. Ordinarily in the gathering device the strains are local, being confined to regions where the head of the pin 28 engages the recess 29 of the funnel. By providing one member with a long groove and the cooperating member on the mating head with a long rib to fit the groove, localization of strains at the interlocking sections of the pin and funnel are avoided and any strains tending to produce angular movement between the heads are distributed through the full length of the interlock formed by the web and groove, thereby preventing damage to the pin where the same interlocks with the apex of the funnel.

The oppositely disposed slots 33 and 34 in the connector body A extend from the rear edge of the hub 17 to the forward faces of the projections 13 and 14. The slots 35 and 36 in the body start at the rear edge of the hub and taper rearwardly of the body to slightly beyond the partial flange formed by the projections 13 and 14.

The rear end of the body A beyond the flange formed by the projections 13 and 14, is provided with a neck 36′ and where the neck joins the projections 13 and 14 there is an annular seat 37 for the base end of a conical spring 38, which is coiled of a tapered bar. The spring tapers rearwardly and the bar comprising the same is of smaller diameter at its rear end, where it bears against a seat or shoulder 39 on an adjustable nut 40, than it is at its larger end. This construction produces means for resisting longitudinal movement of the connector head with a force which increases in greater proportion than the extent of such movement since each coil of the spring will yield and offer a resistance in proportion to its thickness, the lighter coils yielding first and the larger ones following.

The nut 40 is internally threaded to receive the threads 41 on the outer end of a rod or member 42 which at its forward end has a longitudinal flattened part 43. The flattened part 43 has a transverse oblong opening 44 extending therethrough, the opening 44 having a curved or cylindrical inner wall 44′ to form a seat to fit a complementary bearing face, on the flattened section 45 located intermediate the ends 46 of a pivot device or bar 47 as shown.

The ends 46 of the pivot bar are bent out of line with the section 45 and are rounded on their rear faces to fit bearings 48 in the base 11 on diametrically opposite sides of the opening 12 therein. One of said bearings is formed in each of the halves comprising the base 11. It will be noted that the base of the spring 38 will tend to press forwardly against the flange on the rear end of the body whereas the apex or opposite end of the spring tends to force the rod 42 rearwardly. As the rod 42 is located on the axis of the spring and body A and is pivotally anchored in the base 11, the spring when properly adjusted will normally hold the flange against the rear face of the base, and thus sustain the connector at the limit of its forward movement in a comparatively rigid and normally horizontal position but so as to permit a vertical and lateral movement in all directions when the head B engages a mating connector. The rod 42 it will be noted is adapted to rotate universally as respects the base 11, but only in the horizontal plane as respects the pivot bar 47 while the pivot bar 47 itself is adapted to rotate in the vertical plane only as respects the base 11.

In assembling the connector the head end of the rod 42 is passed through the neck 36′ of the body A and the yoke or pivot bar 47 is then inserted from either side through the larger end of the tapering slot 35 in the body until the flat section 45 of the pivot bar fits the oblong opening 44 whereupon the rod 42 is drawn rearwardly and the halves of the base 11 are bolted about the body with the ends 46 of the pivot bar 47 fitting in the bearings 48 of the base 11. The conical spring 38 is then passed around the rod 42 and the nut 40 is fitted on the rod 42 to suitably tension the spring and form an abutment for its outer end. The resistance of the spring and its normal compression are determined by the weight of the connector head, plus an additional resistance sufficient to prevent undue swinging of an uncoupled head when the cars are in motion.

It will be observed that by drawing up on the nut 40 the resistance of the spring against the body of the connector is varied and the movement of the connector head from its normal position is proportionately resisted, but the body and head are normally supported in a substantially horizontal position. The nut 40 is locked against rearward movement from the adjusted position by a pin 50 which passes through a slot 51 in the threaded end of the rod 42.

The operation of the connector will be clear from the foregoing description. When two cars equipped with the connector are moved into engagement the pin and funnel gathering devices on the connectors will guide the ports of the connector heads into register and any tendency for the connector heads to part angularly or rock one upon the other will be prevented by means of the rib on the pin which engages the groove in the funnel, and by reason of the interlocking connections between the members 28 and the recesses 29. The connector is so supported that it may be freely moved in any direction so as to bring the ports therein into register with the ports of opposing connectors and may be readily assembled and adjusted to suit varying conditions of service. Undue rotation of the connector head B about its longitudinal axis is prevented by the pivot bar 47 engaging the walls of the slots 35 and 36. It will be noted that the pivot bearing connection between the pivot bar 47 and the rod 42 is in the same plane as the pivot connection between the pivot bar 47 and the base 11, these two pivot connections of course being at right angles as illustrated in Figure 3. This facilitates the vertical movement of the heads in the act of coupling and renders it unnecessary to have a wide slot in the member A.

It will be clear that various changes may be made in the construction without departing from the spirit of the invention, and therefore I do not wish to be limited to the exact details as shown and described.

Having thus described my invention what I claim is:

1. In an automatic train pipe coupling, the combination of a coupling head having an opening therethrough, a base, a member pivotally mounted on the base and carrying at one end a laterally extending tubular conduit which extends through the opening in said head and terminates approximately in the plane of the coupling face of the latter, said conduit being mounted directly upon said member, means for securing the conduit to the member, a projection near the other end of said member, and means for normally maintaining said projection in engagement with said base to yieldingly support said coupling head.

2. In an automatic train pipe connector, the combination of a base, a body extending through the base and provided at one side of the base with a flange, a coupling head attached to the body on the opposite side of the base, and means for yieldingly sustaining said head and body, said means comprising a member pivotally mounted on the base at each side of said body and extending rearwardly of its bearings and having universal movement relative to said base, and a spring attached to the rear end of said member and bearing against said flange on said body.

3. In an automatic train pipe connector, the combination of a base having an opening therethrough, a connector head and body, said body extending through the opening in said base and having an enlargement at the rear side of said opening, said enlargement forming a shoulder to abut against the base, means for maintaining the said shoulder in its abutting relation, said means comprising a bar extending across said opening and pivoted in opposite sides of the base, a stem extending rearwardly from said bar and having pivotal movement thereon, and a spring confined between the rear end of said stem and the said enlargement on the body.

4. In an automatic train pipe connector, the combination of a base having an opening therethrough, a body having a shoulder abutting against the rear face of said base, and means tending to hold the shoulder in abutting relation with said rear face of the base to yieldingly sustain said coupling head, said means comprising a bar pivoted on the base, a stem connected to the bar and having pivotal movement relative thereto, and a spring positioned at the rear of said base and confined between the free end of said stem and the shouldered part of said body.

5. In an automatic train pipe connector, the combination of a base having an opening extending therethrough, a hollow body having openings on opposite sides thereof, said body extending through said opening in the base and having a shoulder abutting against the rear face of said base, a bar extending through said oppositely arranged openings in the said body and mounted in bearings in said base for rocking movement therein, a stem pivotally connected to said bar and extending rearwardly of the base, and a spring confined between the rear end of the stem and the shouldered part of the body.

6. In an automatic train pipe connector, the combination of a base having an opening extending therethrough, a hollow body having openings at opposite sides thereof, said body extending through the opening in said base and being provided with a shoulder near its rear end which abuts against the rear face of said base, and means for sustaining said shoulder in its abutting relation and thereby maintaining said connector body and head in a predetermined position, said means comprising a yoke having the ends thereof extending through said openings in the sides of said body and supported in bearings in said base for pivotal movement therein, a stem extending rearwardly from said yoke and having an opening through which said yoke extends the stem being adapted to rock on the yoke, and a conical spring confined between the rear end of said stem and the shouldered part of said body and having its base bearing on said body.

7. In an automatic train pipe connector, the combination of a base having an opening extending therethrough, a hollow body having openings on the opposite sides thereof, a hub at the forward end of the body, said body extending through said opening and having a shoulder near its rear end which is adapted to abut against the rear face of said base, a connector head secured to the hub on said body, and means for maintaining the shoulder on said body in abutting relation with the base, said means comprising a yoke having the ends thereof extending through said openings in the body and pivoted in bearings in the base, a stem having an opening in the head end thereof through which said yoke extends, an abutment at the other end of said stem, and a conical spring confined between said abutment and the shouldered end of said body, substantially as described.

8. In an automatic train pipe connector, the combination with a base, of a connector body extending through the base and having a radially extending portion adapted to bear against the rear face of the base, a spring acting to hold the connector body in engagement with the base, a coupling head having an opening therein, a tubular conduit extending through the opening in said head and to one side thereof, said conduit having a shank that extends into a socket formed in the forward end of the connector body.

9. In an automatic train pipe connector, the combination with a base, of a connector body extending through the base and provided with a surface adapted to contact with the base to limit movement of the body through the base in one direction, a spring at the rear of said base and acting to maintain said surface in contact with the base, a stem extending through the spring and provided with an abutment for one end thereof, and a pivot bar connected to said stem and extending through said body into bearings provided therefor in the base for its end portions, for the purpose described.

10. In an automatic train pipe coupling, the combination of a coupling head, a base provided with an opening, a member extending rearwardly through said opening and provided with a projection, a spring acting against the member at the rear of said base and tending normally to hold the projection against said base, a pivot device extending across the opening in the base and mounted for rocking movement in the walls of the latter, and a stem pivotally connected to said pivot device and extending rearwardly of said base through said spring for maintaining the spring in position under compression.

11. In an automatic train pipe coupling, the combination of a coupling head, a base provided in its walls with a bearing, a member extending rearwardly from the head through the base and having in rear of the latter a projection, a pivot device extending from the member into said bearing in which it is adapted to oscillate, a stem movably connected with said pivot device and extending rearwardly of the base, a spring surrounding the stem and abutting said member, and means on the stem for maintaining said spring in position to force said projection against 12. In an automatic train pipe coupling, the combination of a coupling head, a base, a member extending from the head rearwardly through the base and provided in its side with an elongated slot, a projection on said member having an annular seat, a pivot device extending from within the member, through said slot into engagement with the wall of the base for rocking movement relative to the latter, a stem located at the rear of said base and connected with said pivot device, a spring mounted in said annular seat and surrounding said stem, the spring serving to force said projection against said base, and means on the stem for holding said spring in position and for varying the pressure of said spring against the base.

13. In an automatic train pipe coupling, the combination of a coupling head, a member extending from said head and having a radially extending projection, a two-piece base secured about said member and engaging the front face of said projection, one piece of the base being provided with a bearing, a pivot device extending from said member into said bearing for pivotal movement therein, a stem pivotally connected to said pivot device and extending rearwardly therefrom, and a spring confined between the rear end of said stem and said projection for extending the member forwardly of said base to yieldingly sustain said coupling head.

14. In an automatic train pipe coupling, the combination of a coupling head, a base having spaced bearings, a member extending from said head through said base and provided with a projection, a spring acting at the rear of said base and upon said member to hold said projection against said base, a pivot device located on said base transversely thereof and with its ends mounted for pivotal movement in the spaced bearings aforesaid, and having also a central bearing seat, a stem provided with a head having a bearing portion mounted in said seat for rocking movement therein, and means on said stem for maintaining said spring under compression.

15. In an automatic train pipe coupling, the combination of a coupling head, a base provided with bearings, a member extending from said head through said base and provided with a projection, a spring at the rear of said base and acting upon said member to hold said projection against said base, a stem extending into said spring and provided with a perforated head and having also an integral cylindrical portion lying within said perforation, a pivot device having a seat and extending through the perforation of said stem into the bearings of said base with said cylindrical portion mounted in said seat, said pivot device being adapted to rock in said bearings, and means on said stem for maintaining said spring under compression.

16. In an automatic train pipe connector, the combination of a head, a base having oppositely disposed bearings, a device mounted in said bearings for movement about an axis, a member pivotally mounted on said device for movement in planes which include the axis of said device, said member also being movable about said axis, means extending from said head rearwardly to the rear of said base and carrying thereat a projection extending above and below the longitudinal center line of said means, and a spring acting to constantly exert pressure upon said base in all the positions assumed by said coupling head in service, said spring serving to hold said projection in engagement with said base to yieldingly sustain said coupling head, that part of said projection which extends above said center line being of a length sufficiently greater than the part which extends below said line so that the force required to move said head downwardly will be substantially equal to the force required to move it upwardly.

17. In an automatic train pipe connector, the combination of a head, a base having oppositely disposed bearings, a device mounted in said bearings for movement about an axis, a member pivotally mounted on said device for movement relative thereto, said member also being movable in a plane substantially at a right angle to the axis about which said device moves, means extending from said head rearwardly to the rear of said base and carrying thereat a projection which extends above and below the longitudinal center line of said means, and a spring acting to constantly exert pressure upon said base in all the positions assumed by said coupling head in service, said spring serving to hold said projection in engagement with said base, that part of said projection which extends above said center line being of greater length than the part which extends below said line, for the purpose described.

18. In an automatic train pipe connector, the combination of a head, a base having oppositely disposed bearings, a device mounted in said bearings for movement about an axis, a member pivotally mounted on said device for movement relative thereto said member also being movable in a plane substantially at a right angle to the axis about which said device moves, and means cooperating with said device and said member to support said head yieldingly against movement, said means offering a resistance which increases in greater progression than the extent of movement of said head.

19. In an automatic train pipe connector, the combination of a car coupler, a base rigidly secured to the car coupler and supported therefrom, said base having a rear face, a coupling head, a fluid conduit extending laterally of said head and connected therewith, a member connected with said head and extending rearwardly thereof to the rear of said base and mounted thereon, said member being removable from and capable of assembly with the base while said head is connected to said member, said member serving to support said coupling head and conduit in front of said base, a radially extending projection on said member and resting normally against the rear face of said base, a device carried by said base and having a cylindrically formed bearing surface located substantially on the vertical center line of said base, a member having at one end an opening through which said device extends, the forward inner wall of said member being cylindrically formed and mounted on said bearing surface of said device, an abutment at the other end of said member and to the rear of said projection, and a spring confined between said abutment and said projection for normally extending said coupling head with said projection pressed against said base.

20. In an automatic train pipe connector, the combination of a car coupler, a base rigidly attached to said coupler and supported therefrom, said base having a rear face, a coupling head, a member connected with said head and extending rearwardly thereof and to the rear of said base and mounted thereon, said member being removable from and capable of assembly with the base while said head is connected to said member, said member serving to support said coupling head and conduit in front of said base, a radially extending perforated projection on said member and resting normally against the rear face of said base, a device carried by said base and having a cylindrically formed bearing surface located substantially on the vertical center line of said base, a rod extending through said perforation and having at one end an opening through which said device extends, the forward inner wall of said rod being cylindrically formed and mounted on said bearing surface of said device for movement in the horizontal and vertical planes relative to said base, an abutment at the other end of said rod and to the rear of said projection, and a spring confined between said abutment and said projection for normally extending said coupling head with said projection pressed against said base.

21. In an automatic train pipe connector, the combination of a car coupler, a base rigidly attached thereto and having an opening, a device supported on said base and extending transversely of said opening, said device having a cylindrically formed seat, a coupling head having an opening therethrough, a tubular conduit extending through said opening, a body secured to and extending rearwardly of said head to the rear of said base and terminating thereat in a perforated radially extending projection adapted normally to rest against the rear face of said base, said body serving to support said coupling head and conduit in front of said base, a member extending through said perforation and having an eye through which said device extends, said eye having a cylindrically formed bearing surface on its forward wall which normally rests on the seat of said device and is adapted to oscillate thereon relative to said base, an adjustable abutment on that end of said member which extends through said perforation and to the rear thereof, and a spring confined between said abutment and said projection for extending said head with said projection normally resting against said base, whereby said head is yieldingly supported.

22. In an automatic train pipe connector, the combination of a coupling head, a base having an opening therein, said head having a fluid passage extending therethrough and diverging laterally at the rear of said head and in front of said base, a radially extending projection at the rear of said base and normally bearing against the base, means extending through said base and connecting said projection with said head, a device extending across the opening in said base and terminating at either side thereof in cylindrically formed bearing ends which are pivotally mounted in the walls of said base whereby said device may rotate relative to said base, a seat on said device, a member mounted on said seat and adapted to rotate thereon, and a spring acting at all times to maintain said member properly positioned in said seat and to extend said head with said projection normally resting when in the uncoupled position, against the rear face of said base.

23. In an automatic train pipe connector, the combination of a coupling head, a base having an opening therein, said head having a fluid passage extending therethrough, means to support said coupling head in the normal horizontal coupling position, said means comprising a radially extending projection at the rear of said base and normally bearing against the base, a device extending across the opening in said base and terminating at either side thereof in cylindrically formed bearing ends which are pivotally mounted in the walls of said base whereby said device may rotate relative to said base, means connecting said head with said projection and cooperating with said device to prevent undue rotation of said coupling head about its longitudinal axis, and a spring for extending said coupling head forwardly of said base, said spring acting to constantly exert pressure upon said base as said head moves forward and backward in the coupled position in service.

24. In a train pipe connector, the combination with a depending bracket having laterally spaced bearings, of a coupling head, means for yieldingly sustaining the head forward of the bracket said means comprising a pivot bar having its ends mounted in said bearings, said pivot bar being offset rearwardly and having a central bearing surface in line with its end bearings, a member positioned at the rear of said base and having at one end a bearing engaging said central bearing surface and at its other end an abutment for the rear end of a spring, a spring surrounding said member, and a flange connected with the coupling head against which flange the forward end of said spring bears, said flange cooperating with the bracket to sustain the coupling head in coupling position.

25. In a train pipe connector, the combination with a coupling head, of means for yieldingly sustaining the head comprising a depending bracket, a pivot bar provided with a trunnion on each end journaled in the bracket, a rod or member supported on said bracket by said pivot bar and adapted under certain conditions to move in planes which include the axis of said pivot bar without movement of the bar itself and under other conditions to move about said axis, a spring surrounding said rod or member and constantly exerting pressure upon said pivot bar from all the positions assumed by said coupling head in service, and a projection rigid with the head and normally held in contact with the rear face of said bracket by said spring, whereby said coupling head is yieldingly sustained in front of said bracket for free universal movement.

26. In a train pipe connector, in combination, a depending bracket having spaced bearings, a one part pivot bar having integral trunnions journaled in said bearings, a coupling head, a member extending therefrom across the pivot bar, a projection on the rear portion of said member and normally bearing against the rear of said bracket, and a spring pressing said member forwardly and cooperating with said projection and said bracket to yieldingly sustain said coupling head in front of said bracket, said spring acting to exert pressure upon said pivot bar in all the positions assumed by said coupling head when the latter is coupled up in service.

27. In a train pipe connector, a coupling head, a depending bracket having at its lower end a pair of spaces oppositely arranged, vertically disposed portions lying on opposite sides of the longitudinal axis of the connector and each being provided with a bearing, the lower ends of said portions being formed separately one from the other, a pivot bar extending across the space between said portions and having trunnions journalled in said bearings, a rod or member movable in a plane at right angles to the axis of the pivot bar, a spring surrounding said rod or member and acting at all times to hold said pivot bar in position, and a projection rigid with the head and normally held in contact with the bracket by said spring.

28. In a train pipe connector, in combination, a bracket having spaced portions, a coupling head having a projection rigidly connected thereto for contacting with the rear face of the bracket, a pivot bar having its ends journaled in said spaced portions of the bracket, said pivot bar having a seat intermediate its ends, a member pivotally engaging said seat, and a spring for holding said member against said seat and said projection against the bracket, said member being shiftable away from said seat when the pressure of said spring is removed and while said pivot bar remains journaled in said spaced portions.

29. In a train pipe connector, in combination, a depending bracket having spaced bearings and also having a rear face, a coupling head having a projection connected thereto for contacting with the rear face of the bracket, a rigid pivot bar mounted in the bearings in the bracket and having intermediate its ends a surface forming an open seat facing towards said head, a member pivotally engaging said seat, and means for yieldingly holding said member in said seat and said projection against said rear face of the bracket, said means acting to exert pressure on said member at all times when said head is coupled up in service.

30. In a train pipe connector, the combination with a depending bracket having an opening therein and a coupling head, of means for yieldingly sustaining the head in the normal horizontal coupling position forward of the bracket, said means comprising a pivot bar extending across said opening and journaled in the sides of said bracket, said pivot bar having a bearing seat on its front face intermediate its ends, a spring abutment device pivotally seated on said bearing seat, a projection connected with the coupling head and adapted to contact with the rear face of the bracket, and a spring bearing on said abutment device and pressing said projection against the rear face of the bracket, said spring acting to exert pressure upon said abutment device in all the positions assumed by said coupling head in service.

31. In an automatic train pipe connector, in combination, a coupling head provided with a rearwardly extending part or body carrying a laterally extending projection, a bracket the base of which comprises a pair of transversely spaced portions which span said part or body, the lower ends of said portions being formed separately one from the other and each being provided with a bearing, a pivot bar having its ends journaled in said bearings and rotatable on a horizontal axis only, said pivot bar having a curved seat on its front face extending at right angles to the axis of the bar, a member having a curved portion pivotally engaging said seat, and a spring for yieldingly holding said member in said seat and for extending said coupling head forward of said bracket with said projection bearing against the base of the bracket.

32. In an automatic train pipe connector, the combination of a base having a rear face and a bearing, a radially extending projection positioned at the rear side of said base and adapted to contact with said face, a coupling head in front of said base, means connecting said head with said radially extending projection, a device pivotally mounted in the bearing on said base for movement relative to said base only about a predetermined axis, a member pivotally mounted on the front face of said device and carrying an abutment to receive a spring which member and abutment are adapted to move relative to said device only in a predetermined plane, and a spring seated against said abutment carried by said member and serving to support said head with said radially extending projection pressing against said rear face of said base, said spring acting to exert pressure against said member in all the positions assumed by said head in service.

33. In an automatic train pipe connector, the combination of a base having an opening and oppositely disposed bearings, a radially extending projection positioned at the rear of said base and arranged to contact with the rear face of the base, a coupling head, a member connected with said head and said radially extending projection, a pivot device extending laterally of said member into the bearings in said base and having rocking movement therein, said device having intermediate its ends a surface forming a seat facing and opening toward said head, a support for a spring pivotally mounted on said seat, and a spring positioned on said support for holding said projection normally against the rear face of said base and for extending said coupling head, said spring operating to exert pressure on said projection and said pivot device at all times.

34. In an automatic train pipe connector, the combination of a coupling head, a member connected with said head and extending rearwardly thereof and carrying at its rear end a radially extending projection, a base having portions which extend from above said member to either side thereof and carry bearings, said projection being arranged to contact with the rear face of said base to limit the forward movement of said head, a rigid pivot device extending laterally of said member into said bearing for locking movement therein, said device being provided with a bearing on its front surface, a support for a spring pivotally mounted in the bearing on said device, a spring mounted on said support and acting to extend and yieldingly support said head against lateral movement and to constantly exert a pressure thereon and on said pivot device which pressure varies as said coupling head moves in and out when coupled up in service, and means for maintaining said spring in position.

35. In a train pipe connector, in combination, a depending bracket having spaced bearings, a coupling head having a laterally diverging passage extending therethrough and terminating adjacent the rear part of the head, means at the rear end of said passage for attaching a train pipe hose, a pivot bar having integral trunnions journaled in said bearings and rotatable on a predetermined axis only, a rod or member pivotally associated with said bar and movable relative thereto, said rod or member also being movable in a plane at right angles to the axis of said bar, a coiled spring surrounding said rod or member and acting to constantly exert pressure upon said bracket during the running in and out of the car couplers when said coupling head is coupled up in service, and a part rigid with the head and normally held in contact with the bracket by said spring.

36. In a train pipe connector, a bracket having spaced portions provided with bearings, a rigid pivot bar journaled in said bearings, said bar having a depression on its front face forming a seat, a device pivotally engaging said seat and shiftable longitudinally therein while said bar remains journaled in said bearings, a coupling head having a passage therethrough the rear portion of which passage diverges laterally and terminates adjacent the rear part of the head, means at the rear end of said passage for attaching a train pipe hose, a member secured to said head and extending rearwardly thereof and having a projection adapted to contact with the rear face of the bracket, and a spring for yieldingly holding said device in said seat and said projection against the rear face of the bracket.

37. In an automatic train pipe connector, the combination of a coupling head, a bracket the lower end of which comprises a pair of vertically extending oppositely disposed portions provided each with a bearing, a pivot device extending across the opening between said portions and having trunnions journaled in said bearings and having also a seat intermediate its ends, a spring support mounted in said seat for rocking movement, a member at the rear of said head and extending rearwardly thereof through said base and carrying a radially extended projection which normally engages the rear side of the base, a spring supported at one end by said spring support and serving to resist movement of said coupling head and to constantly exert pressure on said pivot device under all conditions of service, said projection and said base so interacting as to permit upward movement of said coupling head from the normal uncoupled position with less compressional movement or deflection of the coils of said spring than is caused by downward movement of said coupling head from such position.

38. In an automatic train pipe connector, the combination with a depending bracket and a coupling head, of means for yieldingly sustaining the head forward of the bracket comprising a pivot bar provided with a trunnion on each end journaled in said bracket, a rod or member engaging said pivot bar and movable in a plane transverse to the axis of the pivot bar, a spring surrounding said rod or member and constantly exerting pressure upon said pivot bar in all of the positions said coupling head assumes in service, and a part rigid with the head and normally held in contact with the bracket by said spring whereby said coupling head is yieldingly sustained, the pivotal axis of said pivot bar and said rod or member being in substantially the same vertical plane.

39. In an automatic train pipe connector, a coupling head, a bracket having spaced portions at its lower end, a pivot device pivotally mounted on said bracket and extending between said spaced portions of the same, said device having intermediate its ends an open seat facing toward said head, a member mounted on said seat, said member being shiftable into and out of said seat while said pivot device is in position on the bracket, a projection adapted to contact with the rear of the bracket, means connecting said head with said projection, and a spring for holding said projection against the bracket and said member against its seat.

40. In an automatic train pipe connector, a coupling head, a bracket having spaced portions at its lower end, a one-piece pivot device having integrally formed trunnions secured thereto mounted in said spaced portions of the bracket, said device having intermediate its ends an open seat facing toward said head, a member pivotally mounted in said seat, a projection adapted to contact with the rear of the bracket, means connecting said head with said projection, and a spring exerting pressure to hold said projection against the bracket and said member against its seat, said member being shiftable into and out of said seat while said pivot device is in position and the pressure of said spring against the member is removed.

41. In an automatic train pipe connector, the combination of a coupling head, a bracket, a member extending rearwardly of said head past said bracket and having a vertically disposed perforated projection adapted to contact with the rear face of the bracket, said member being pivotally supported on the bracket at opposite sides of the latter in approximately the horizontal plane, a non-resilient tie rod pivotally mounted on the bracket and extending rearwardly thereof through said projection, and a compression spring surrounding said tie rod and engaging said projection to yieldingly sustain said coupling head.

42. In an automatic train pipe connector, the combination of a coupling head, a bracket, a member secured to said head and extending rearwardly past said bracket and carrying a projection adapted normally to engage the rear side of the bracket, said member having a pair of oppositely disposed elongated slots, supports extending away from opposite sides of said bracket into said slots, said supports being disposed in the horizontal plane, a tie rod pivoted to said bracket for movement relative to said supports, the tie rod extending rearwardly of said bracket, a compression spring surrounding said tie rod and engaging said projection to yieldingly sustain said coupling head, and an abutment for the spring mounted on said tie rod and adjustable longitudinally thereon to compress said spring.

43. In an automatic train pipe connector, a bracket, a coupling head, a member secured to said head and extending rearwardly past said bracket and having a projection for contacting with the rear face of the bracket, said member being provided on opposite sides with longitudinally extending slots, said slots being arranged in substantially the same horizontal plane, means carried by said bracket and extending into said slots whereby said member is sustained in position on said bracket, a tie rod pivotally connected to said bracket and extending rearwardly thereof, an abutment adjustably mounted on said tie rod, and a spring surrounding said tie rod and bearing at one end against said abutment and at the other end against said projection, said spring being adapted to be compressed when said coupling head couples up in service.

44. In an automatic train pipe coupling, the combination of a coupling head having an opening therethrough, a base, a member having a hollow forward end which extends into the opening in said head, the member having also a hollow rear portion which extends rearwardly towards said base, a conduit extending laterally out of the forward end of said member and adapted to receive a train pipe hose, a projection on the other end of the member, and means for normally maintaining said projection in engagement with the rear side of said base to yieldingly support said coupling head, said means including a spring pivotally supported on said base.

45. In an automatic train pipe coupling, the combination of a coupling head having an opening therethrough, a base, a member having a hollow forward end, a conduit formed separate of said member and secured in the forward hollow end thereof and extending into the opening in said head, said member having also a hollow rear portion which extends rearwardly past said base and being provided with a projection, and means for normally maintaining said projection in engagement with the rear side of said base to yieldingly support said coupling head, said means including a spring pivotally supported on said base.

46. In an automatic train pipe coupling, the combination of a coupling head having an opening therein, a base, a member having a hollow forward end, a conduit formed separate of said member and removably secured in the forward hollow end thereof and extending into the opening in said head, said conduit also extending laterally of said member, a gasket supported in the front end of said conduit and adapted to abut a similar gasket in a companion head, said member also having a portion which extends rearwardly of said coupling head and past said base, a projection on said member for engaging the rear face of the base, and means for maintaining said projection normally in engagement with the base to yieldingly support said coupling head, said means including a tie rod, a coiled spring, and a part carried by said base and engaging said tie rod.

In testimony whereof I affix my signature.

JOSEPH V. ROBINSON.